United States Patent
Svakhin

(10) Patent No.: US 10,109,102 B2
(45) Date of Patent: Oct. 23, 2018

(54) RENDERING AN INFINITE PLANE

(71) Applicant: ADOBE SYSTEMS INCORPORATED, San Jose, CA (US)

(72) Inventor: Nikolai Svakhin, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/450,982

(22) Filed: Mar. 6, 2017

(65) Prior Publication Data
US 2017/0178394 A1 Jun. 22, 2017

Related U.S. Application Data

(63) Continuation of application No. 13/653,317, filed on Oct. 16, 2012, now Pat. No. 9,626,792.

(51) Int. Cl.
| | | |
|---|---|---|
| *G06T 15/30* | (2011.01) | |
| *G06T 7/90* | (2017.01) | |
| *G06T 7/40* | (2017.01) | |
| *G06T 15/80* | (2011.01) | |
| *G06T 17/10* | (2006.01) | |

(52) U.S. Cl.
CPC ............. *G06T 15/30* (2013.01); *G06T 7/40* (2013.01); *G06T 7/90* (2017.01); *G06T 15/80* (2013.01); *G06T 17/10* (2013.01); *G06T 2200/04* (2013.01)

(58) Field of Classification Search
USPC ........ 345/426, 419, 427, 582, 622, 623, 420
See application file for complete search history.

(56) References Cited

U.S. PATENT DOCUMENTS

| | | | |
|---|---|---|---|
| 6,310,620 B1 | 10/2001 | Lauer et al. | |
| 6,373,489 B1 * | 4/2002 | Lu | ............................. G06T 17/05 345/420 |
| 6,437,782 B1 | 8/2002 | Pieragostini et al. | |
| 6,459,438 B1 | 10/2002 | Mang | |
| 6,680,735 B1 * | 1/2004 | Seiler | ..................... G06T 15/005 345/419 |
| 6,774,895 B1 | 8/2004 | Papakipos et al. | |

(Continued)

OTHER PUBLICATIONS

Non-Final Office Action dated Jul. 8, 2016 in U.S. Appl. No. 13/653,317, 16 pages.

(Continued)

*Primary Examiner* — Kimbinh T Nguyen
(74) *Attorney, Agent, or Firm* — Shook, Hardy & Bacon, L.L.P.

(57) ABSTRACT

A machine may render a view that includes a portion of an infinite plane within a three-dimensional (3D) space. The machine may determine a polygon within a frustum in the 3D space. The polygon may be determined by calculating an intersection of the frustum with the infinite plane. The polygon may represent that portion of the infinite plane which lies within the boundaries of the frustum. The machine may then determine a color of an element of this polygon according to one or more algorithms, default values, or other programming for depicting the infinite plane within the 3D space. The color of this element of the polygon may be that applied by the machine to a further element that is located on the far plane of the frustum, and this further element may be located at a height above the polygon within the 3D space.

20 Claims, 16 Drawing Sheets

Top right front perspective view

(56) References Cited

U.S. PATENT DOCUMENTS

| | | | |
|---|---|---|---|
| 7,102,636 B2 * | 9/2006 | Reshetov | G06T 17/20 |
| | | | 345/419 |
| 7,145,565 B2 | 12/2006 | Everitt et al. | |
| 7,224,359 B1 | 5/2007 | Papakipos et al. | |
| 7,292,242 B1 | 11/2007 | Wittenbrink et al. | |
| 7,746,355 B1 | 6/2010 | Cai et al. | |
| 7,852,574 B1 | 12/2010 | Teter | |
| 8,115,783 B2 | 2/2012 | Nystad et al. | |
| 8,212,840 B2 | 7/2012 | Jiao et al. | |
| 8,237,739 B2 | 8/2012 | Bi et al. | |
| 8,325,186 B2 * | 12/2012 | Diamand | G06T 15/405 |
| | | | 345/419 |
| 8,493,383 B1 * | 7/2013 | Cook | G06T 15/06 |
| | | | 345/419 |
| 8,593,459 B2 | 11/2013 | Mejdrich et al. | |
| 8,675,013 B1 * | 3/2014 | Romaszewicz | G06T 15/20 |
| | | | 345/622 |
| 9,072,971 B2 * | 7/2015 | Hayashida | H04N 13/0275 |
| 9,153,068 B2 | 10/2015 | Laine et al. | |
| 2010/0328428 A1 * | 12/2010 | Booth, Jr. | G06T 15/30 |
| | | | 348/46 |
| 2011/0169822 A1 * | 7/2011 | Gardella | G06T 11/40 |
| | | | 345/419 |
| 2012/0327071 A1 | 12/2012 | Laine et al. | |

OTHER PUBLICATIONS

First Action Interview Office Action dated Jun. 16, 2015 in U.S. Appl. No. 13/653,317, 6 pages.
Preinterview First Office Action dated Mar. 25, 2015 in U.S. Appl. No. 13/653,317, 5 pages.

* cited by examiner

Right side view

Top view

Rendered Screenshot

Rendered Screenshot

RENDERING AN INFINITE PLANE

CROSS-REFERENCE TO RELATED APPLICATIONS

This application is a continuation of U.S. patent application Ser. No. 13/653,317, filed on Oct. 16, 2012, which is hereby incorporated by reference in its entirety.

TECHNICAL FIELD

The subject matter disclosed herein generally relates to computer graphics and computer-generated imagery (CGI). Specifically, the present disclosure addresses systems and methods to render a plane.

BACKGROUND

In computer graphics and CGI, a frustum (e.g., a view frustum or a viewing frustum) may define some portion of, or all of, a three-dimensional (3D) space that may be rendered for presentation (e.g., displayed on a screen to a user). For example, a virtual world may be defined within the 3D space, and virtual objects may exist in the virtual world as 3D objects within the 3D space.

A rendering machine (e.g., a machine that forms all or part of a rendering system) may render a view of the 3D space, or a portion thereof, by determining which 3D objects are to be rendered (e.g., shown in a two-dimensional (2D) image or scene that depicts the 3D space or some portion thereof) and which 3D objects are not be rendered (e.g., omitted from the image or scene that depicts the 3D space or the portion thereof). Commonly, the rendering machine generates (e.g., calculates) a frustum within the 3D space (e.g., based on the position and orientation of a virtual camera located within the 3D space). The rendering machine may render the view of the 3D space by rendering 3D objects and portions of 3D objects that are located within the frustum, while 3D object and portions of 3D objects that are located outside the frustum may be omitted from the rendered view (e.g., image or scene) of the 3D space.

BRIEF DESCRIPTION OF THE DRAWINGS

Some embodiments are illustrated by way of example and not limitation in the figures of the accompanying drawings.

DETAILED DESCRIPTION

Example methods and systems are directed to rendering an infinite plane (e.g., an infinite ground plane). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., a rendering machine that forms all or part of a rendering system) may be configured to render a view (e.g., an image or scene) that depicts all or part of a 3D space that contains an infinite plane. One example of such an infinite plane is an infinite ground plane, which may be defined as the set of all points for which height (e.g., z-coordinate or y-coordinate, depending on orientation of axes) is zero within the 3D space. In many situations, the plane formed by all points at zero height (e.g., zero distance along a vertical axis) represents the "ground" or "ground level" within a virtual world. For purposes of clarity, the discussion herein focuses on rendering an infinite ground plane whose height is zero with respect to the 3D space (e.g., with respect to a coordinate system defined for the 3D space). However, in various example embodiments, any infinite plane in the 3D space may be designated as "ground," and the systems and methods described herein are suitable for rendering any infinite plane within a 3D space.

As discussed in greater detail below, the machine may determine a polygon within a frustum (e.g., a view frustum) within the 3D space. The polygon may be determined by calculating an intersection of the frustum. with a ground plane, where the ground plane may be an infinite ground plane that is defined by a set of all points for which height (e.g., z-coordinate or y-coordinate) is zero within the 3D space. That is, the polygon may be defined by the intersection of the frustum and the ground plane. Moreover, the polygon may be representative of a portion of the ground plane within the frustum. In other words, the polygon may represent that portion of the ground plane which lies within the frustum (e.g., within the boundaries of the frustum). The machine may then determine a color of an element of this polygon (e.g., according to one or more algorithms, default values, or other programming for depicting the ground plane within the 3D space). The color of this element of the polygon may be that applied by the machine to a further element that is located on the far plane (e.g., far clip plane or far clipping plane) of the frustum, and this further element may be located at a non-zero height above the polygon (e.g., higher than the polygon) within the 3D space.

Figure 1:
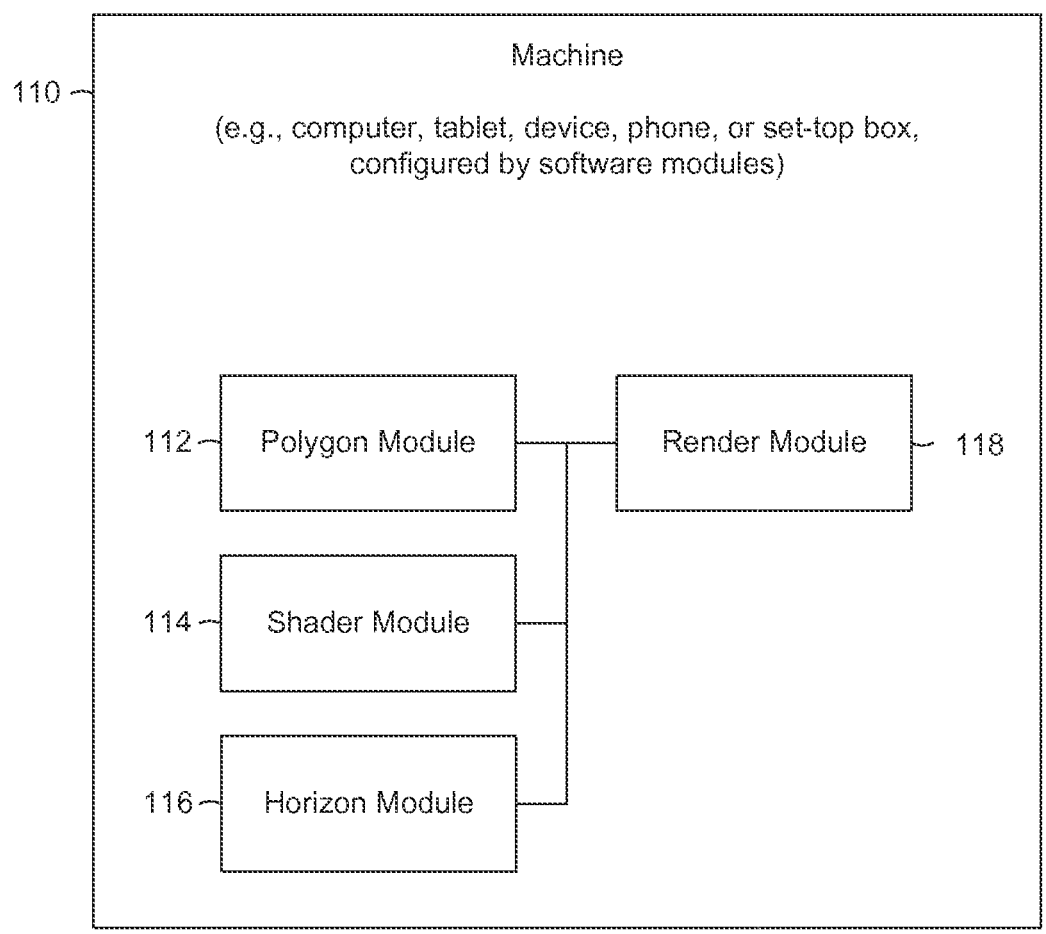
FIG. 1 is a block diagram of a machine (e.g., render machine) suitable for rendering an infinite plane (e.g., an infinite ground plane) within a 3D space, according to some example embodiments.

FIG. 1 is a block diagram of a machine 110 (e.g., a render machine, a simulation machine, a game machine, a 3D modeling machine, or any suitable combination thereof) that is suitable for rendering an infinite ground plane within a 3D space, according to some example embodiments. As shown, the machine 110 includes a polygon module 112, a shader module 114, a horizon module 116, and a render module 118, all configured to communicate with each other (e.g., via a bus, shared memory, a switch, or parameter passing).

Any one or more of the modules described herein may be implemented using hardware (e.g., a processor of the machine 110) or a combination of hardware and software. For example, any module described herein may configure a processor to perform the operations described herein for that module. Moreover, any two or more of these modules may be combined into a single module, and the functions described herein for a single module may be subdivided among multiple modules.

The machine 110 may be implemented in a computer system, in whole or in part, as described below with respect to FIG. 16. For example, the machine 110 may be implemented in a general-purpose computer that is modified (e.g., configured or programmed) by software modules to be a special-purpose computer to perform some or all of the functions described herein. According to various example embodiments, the machine 110 may be or include a desktop computer, a vehicle computer, a tablet computer, a navigational device, a portable media device, a smart phone, a set-top box, or any suitable combination thereof. The machine 110 may be configured (e.g., by software modules) to perform one or more of the methodologies described herein, in full or in part. Furthermore, the functions described herein for the machine 110 or its modules may be subdivided among multiple machines.

The polygon module 112 is configured to determine a frustum (e.g., view frustum) and determine a polygon formed by the intersection of the frustum with the infinite ground plane. The shader module 114 is configured to determine a color of an element of the polygon. The horizon module 116 is configured to apply the color of the element of the polygon to a further element that is located above the ground plane on the far plane of the frustum. The render module 118 is configured to render a view (e.g., an image or scene) of the 3D space, where the view of the 3D space depicts at least a portion of the 3D space, including a portion of the infinite ground plane. Further details on the functions of these modules are discussed below with respect to FIG. 13-15.

Figure 2:
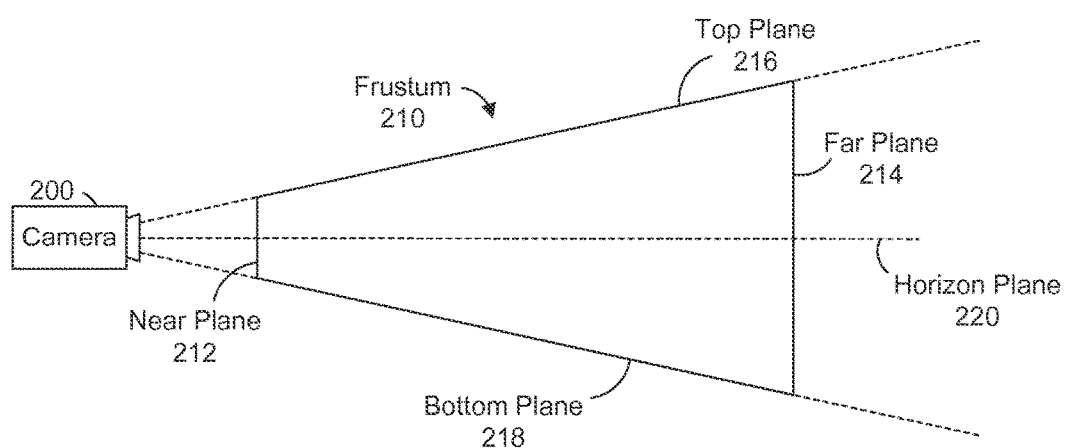
FIG. 2 is a right side elevation view of a frustum suitable for rendering an infinite plane, according to some example embodiments.

FIG. 2 is a right side elevation view of a frustum 210 (e.g., a view frustum) within a 3D space, according to some example embodiments. The frustum 210 is suitable for rendering an infinite ground plane, or a portion thereof, in accordance with one or more of the methodologies described herein. The frustum 210 may be defined with respect to a camera 200 from which a view of the 3D space is to be rendered. The camera 200 is located within the 3D space and has an orientation (e.g., a direction) within the 3D space, and the frustum 210 may be defined by the position of the camera 200 and the orientation of the camera 200. In some example embodiments, the camera 200 is a virtual camera that exists at a single point within the 3D space and points in a particular direction within the 3D space. Accordingly, the camera 200 may be represented by a vector within the 3D space.

As shown in FIG. 2, the frustum 210 may be bounded by a near plane 212 (e.g., a near clip plane or a near clipping plane), a far plane 214 (e.g., a far clip plane or a far clipping plane), a top plane 216 (e.g., a top or upper clip plane, or a top or upper clipping plane), and a bottom plane 218 (e.g., a bottom or lower clip plane, or a bottom or lower clipping plane), among other planes that bound the frustum 210. The top plane 216 may be coplanar with an infinite plane that extends from the camera 200 into the 3D space. The bottom plane 218 may similarly be coplanar with another infinite plane that extends from the camera 200 into the 3D space. These two infinite planes may intersect on a line that includes the position of the camera 200. The angle formed by this intersection may define or be equal to a vertical viewing angle of the camera 200. A horizon plane 220 may extend from the camera 200 along its direction of orientation (e.g., towards infinity), and the horizon plane 220 may represent an infinite plane that extends from the position of the camera 200 outward to an infinite horizon of the camera 200 (e.g., outward to an infinite distance from the camera 200). Accordingly, the horizon plane 220 may bisect the vertical viewing angle of the camera 200.

The near plane 212 may define a minimum distance from the camera 200 for objects to be rendered. The far plane 214 may define a maximum distance from the camera 200 for objects to be rendered. The top plane 216 may define a maximum height (e.g., highest y-position in x-y-z space) for objects to be rendered. The bottom plane 218 may define a minimum height (e.g., lowest y-position in x-y-z space) for objects to be rendered.

Figure 3:
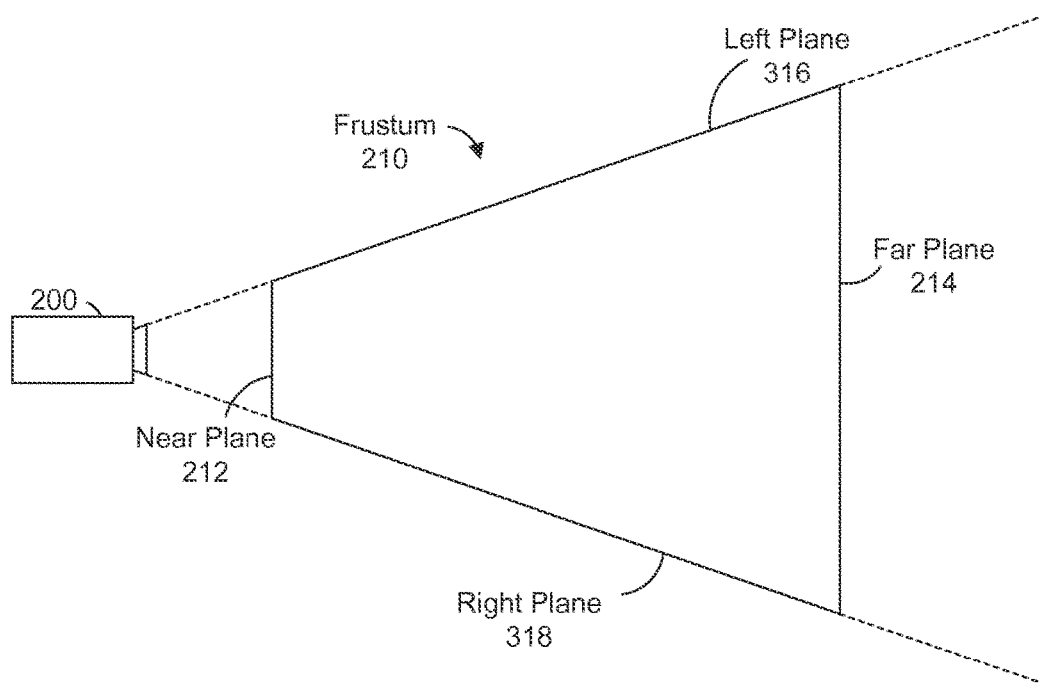
FIG. 3 is a top plan view of the frustum, according to some example embodiments.

FIG. 3 is a top plan view of the frustum 210, according to some example embodiments. As discussed above, the frustum 210 is defined by the position orientation of the camera 200 and is bounded by the near plane 212 and the far plane 214. As shown in FIG. 3, the frustum 210 is also bounded by a left plane 316 (e.g., a left clip plane or a left clipping plane) and a right plane 318 (e.g., a right clip plane or a right clipping plane). The left plane 316 may be coplanar with an infinite plane that extends from the camera 200 into the 3D space. The right plane 318 may similarly be coplanar with another infinite plane that extends from the camera 200 into the 3D space. These two infinite planes may intersect on a line that includes the position of the camera 200. The angle formed by this intersection may define or be equal to a horizontal viewing angle of the camera 200.

The left plane 316 may define a leftmost position (e.g., maximum x-position in x-y-z space) for objects to be rendered. The right plane 318 may define a rightmost position (e.g., maximum x-position in x-y-z space) for objects to be rendered.

Figure 4:
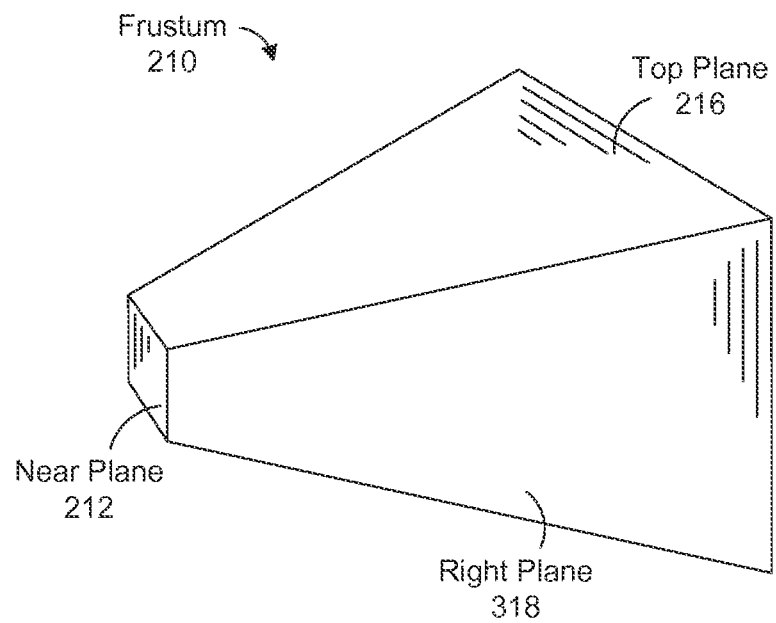
FIG. 4 is a top right front perspective view of the frustum, showing surfaces of the frustum, according to some example embodiments.

FIG. 4 is a top right front perspective view of the frustum 210, showing the near plane 212, the top plane 216, and the right plane 318 as surfaces of the frustum 210, according to some example embodiments. These three surfaces of the frustum 210 are shaded to indicate the three-dimensional nature of the frustum. 210. Not shown in FIG. 4 are the left plane 316, the bottom plane 218, and the far plane 214, which are also surfaces of the frustum 210. Accordingly, the frustum 210 may be defined by and bounded by its surfaces.

Figure 5:
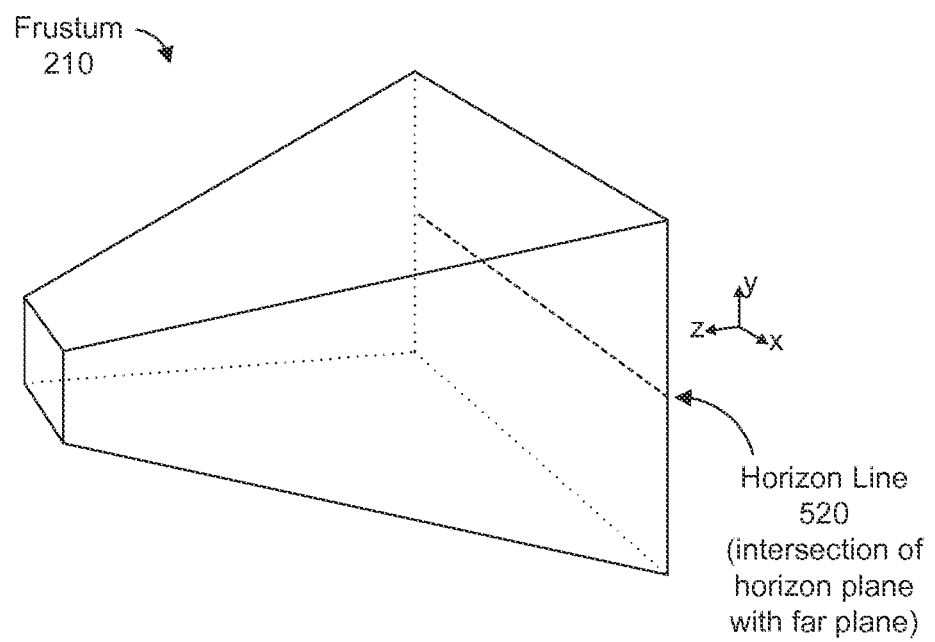
FIG. 5 is a top right front perspective view of the frustum, showing a horizon line on the far plane of the frustum, according some example embodiments.

FIG. 5 is a top right front perspective view of the frustum 210, showing a horizon line 520 on the far plane 214 of the frustum 210, according to some example embodiments. The horizon line 520 may be defined by the intersection of the horizon plane 220 with the far plane 214.

Figure 6:
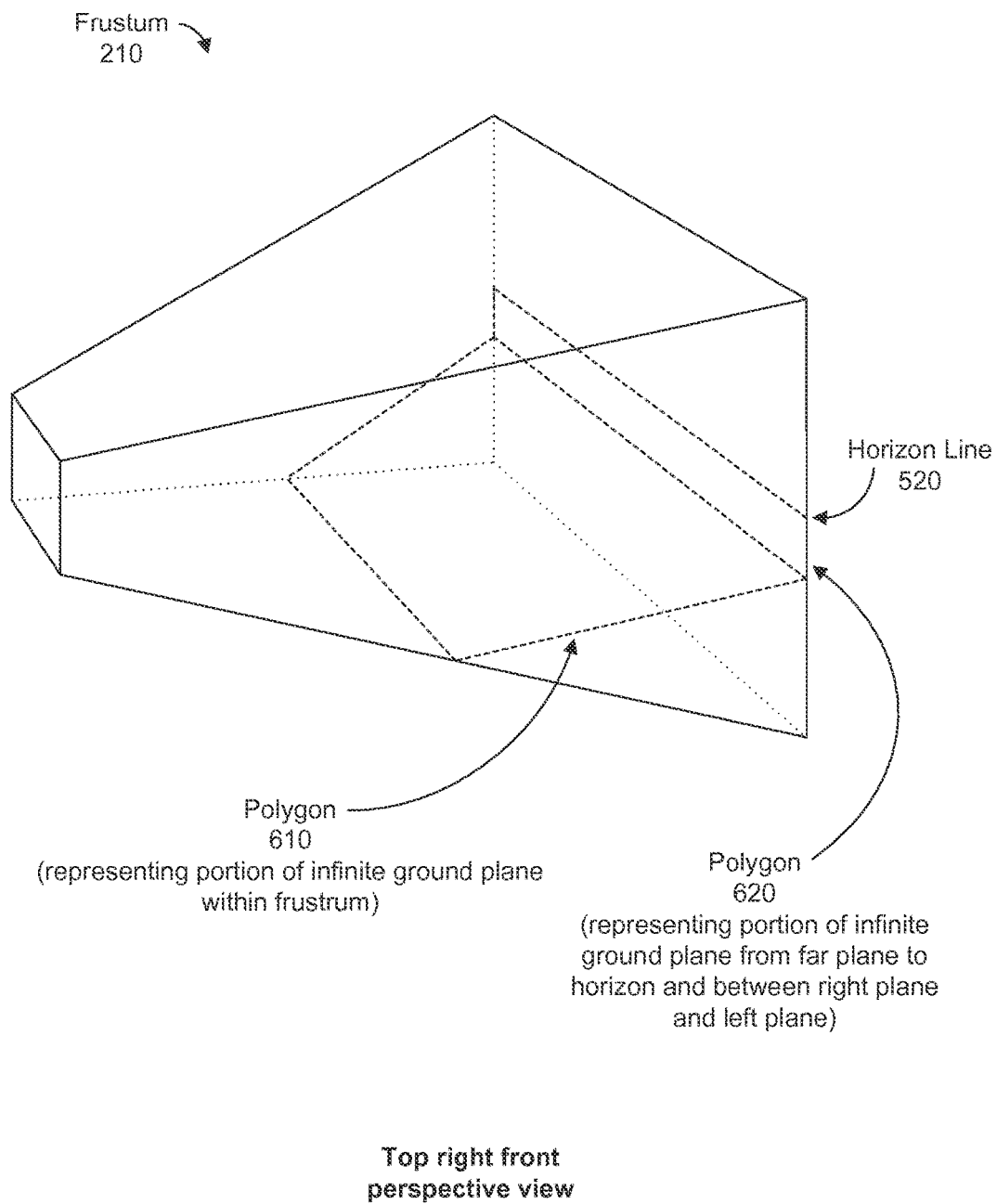
FIG. 6 is a top right front perspective view of the frustum, showing polygons suitable for rendering an infinite plane, according to some example embodiments.

FIG. 6 is a top right front perspective view of the frustum 210, showing polygons 610 and 620, which may be used in rendering the infinite ground plane, according to some example embodiments. As shown in FIG. 6, the polygon 610 may represent a portion of the infinite ground plane, specifically, that portion of the infinite ground plane that lies within the frustum 210. The polygon 610 may be determined (e.g., by the polygon module 112 of the machine 110) by calculating the intersection of the infinite ground plane with the frustum 210 (e.g., with the surfaces that define the frustum 210). The polygon 610 may be defined by and bounded by those surfaces of the frustum. 210 that intersect the infinite ground plane. In the example embodiment shown in FIG. 6, the polygon 610 is defined by and bounded by the intersections of the infinite ground plane with the left plane 316, the right plane 318, the bottom plane 218, and the far plane 214.

The polygon 620 may represent a portion of the infinite ground plane from the far plane 214 to the horizon of the camera 200 (e.g., an infinite horizon extending an infinite distance from the camera 200). In other words, that portion of the infinite ground plane that lies beyond the far plane 214 (e.g., between the far plane 214 and infinity) may be represented by the polygon 620, which is finite. The polygon 620 may be determined (e.g., by the polygon module 112 of the machine 110) based on the polygon 610 and the horizon line 520. The polygon 620 may be defined by and bounded by the horizon line 520, the intersection of the polygon 610 with the far plane 214, and the intersections of other surfaces of the frustum 210 with the far plane 214. In the example embodiment shown in FIG. 6, the polygon 620 is defined by and bounded by the horizon line 520, the left plane 316, the right plane 318, and the intersection of the polygon 610 with the far plane 214. The intersection of the polygon 610 with the far plane 214 may also be denoted as the intersection of the infinite ground plane with the far plane 214.

Together, the polygons 610 and 620 represent that portion of the infinite ground plane which is viewable from the camera 200. When rendered, the polygons 610 and 620 depict the viewable portion of the infinite ground plane. Accordingly, the polygons 610 and 620 may be colored or textured (e.g., drawn with a particular color scheme, grid pattern, color gradient, brightness gradient, or any suitable combination thereof) in a manner that seamlessly blends a transition between the polygon 610 and the polygon 620. That is, the polygons 610 and 620 may be colored or textured such that the intersection of the polygon 610 with the polygon 620 is seamless and invisible in the final rendered view of the 3D space.

Figure 7:
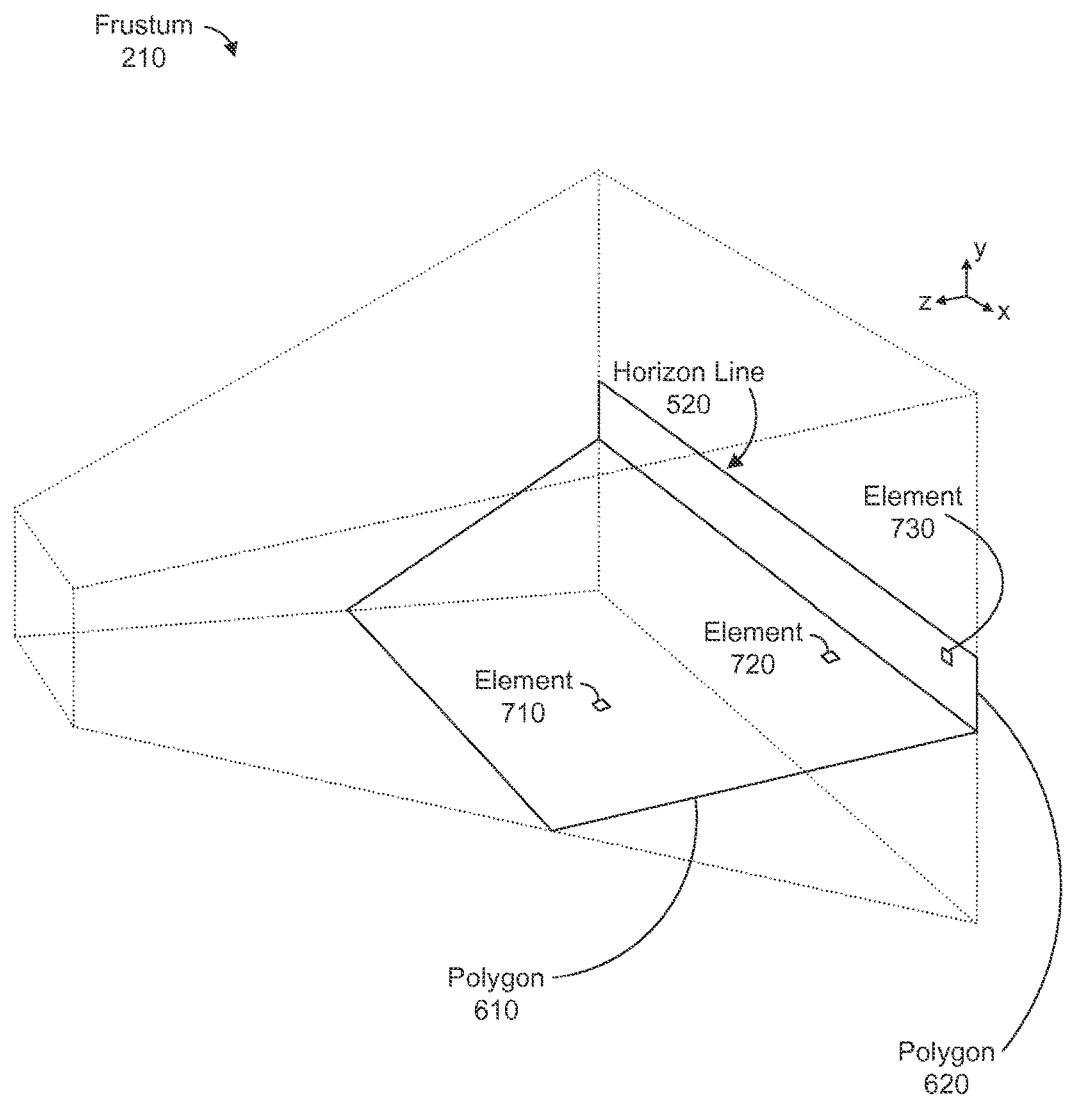
FIG. 7 is a top right front perspective view of the frustum, showing elements of the polygons, according to some example embodiments.

FIG. 7 is a top right front perspective view of the frustum 210, showing elements 710 and 720 of the polygon 610 and element 730 of the polygon 620, according to some example embodiments. The element 710 and 720 are part of the polygon 610, and the element 730 is part of the polygon 620. Since the polygon 620 is coplanar with the far plane 214, the element 730 likewise lies in (e.g., is located on) the far plane 214. Moreover, the element 730 may be located at a height (e.g., a nonzero height) above the polygon 610 (e.g., above the intersection of the polygon 610 with the polygon 620) within the 3D space.

One or more of the elements 710, 720, and 730 may correspond to, or determine the color of, a pixel in the final rendered view of the 3D space. In certain example embodiments, one or more of the elements 710, 720, and 730 may correspond to, or determine the color of, a group of pixels (e.g., a macroblock) in the final rendered view of the 3D space. The shader module 114 of the machine 110 may be configured to determine the colors of the elements 710 and 720, and the horizon module 116 of the machine 110 may be configured to determine the color of the element 730. These colors may correspond to, or determine the colors of pixels that will be rendered in the view of the 3D space so that the polygons 610 and 620 seamlessly appear to blend together and thus depict the portion of the infinite ground plane that is viewable from the camera 200 as being smooth and continuous.

As shown in FIG. 7, the element 710 is part of the polygon 610 and is located further from the intersection of the polygon 610 with the polygon 620 than the element 720, which is also a part of the polygon 610 but is closer to the intersection than the element 710. According to various example embodiments, the shader module 114 may determine the color of the element 710 and also may determine the color of the element 720. The elements 710 and 720 may have different colors.

In addition, the horizon module 116 of the machine 110 may determine the color of the element 730, which is part of the polygon 620. The color of the element 730 may be determined based on the color of the element 720, the color of the element 710, or both. In some example embodiments, the horizon module 116 determines that the color of the element 730 is the same as the color of the element 720, but different from the color of the element 710. This may have the effect of determining the color of the element 730 based on (e.g., as being identical to or similar to) the color of the element 720, which is closer to the intersection of polygon 620 with the polygon 610 than the element 710. That is, the color of those elements of the polygon 610 (e.g., element 720) that are close to the intersection of the polygons 610 and 620 (e.g., within a predetermined threshold distance) may be duplicated or approximated in elements of the polygon 620 (e.g., element 730). Where elements on both sides of the intersection of the polygons 610 and 620 have the same color or have similar colors, the intersection may be invisible in the final rendered view of the infinite ground plane within the 3D space.

As used herein, the determination of a "color" for an element includes determination of its color information, as well as its brightness information (e.g., values for red, green, and blue; or values for hue, saturation, and intensity) and transparency information (e.g., alpha value). The shader module 114, the horizon module 116, or both, may determine the color of an element based on one or more algorithms (e.g., shading algorithms), color schemes, texture schemes, grid patterns, color gradients, brightness gradients, default values, or other programming for depicting the infinite ground plane within the 3D space.

For example, the shader module 114 may implement a grid pattern (e.g., unit width lines for every ten units of distance in a u-v space that is local to the polygon 610) in which gridlines are drawn in light gray with no transparency, while spaces between grid lines are drawn with full transparency. The horizon module 116 may similarly implement the same grid pattern. By determining the color of the element 730 based on the color of the element 720, the horizon module 116 may draw gridlines on the polygon 620 with no discernible transition from the polygon 610 to the polygon 620. As another example, the shader module 114 and the horizon module 116 may both implement a smooth single-color gradient that is brighter near the camera 200 and darkens toward the horizon of the camera 200, such that the element 710 is colored more brightly than the element 720. Again, by determining the color of the element 730 based on the color of the element 720, the horizon module 116 may color the polygon 620 with no discernible transition from the polygon 610 to the polygon 620. In some example embodiments, the horizon module 116 determines the color of the element 730 by copying the color of the element 720.

Figure 8:
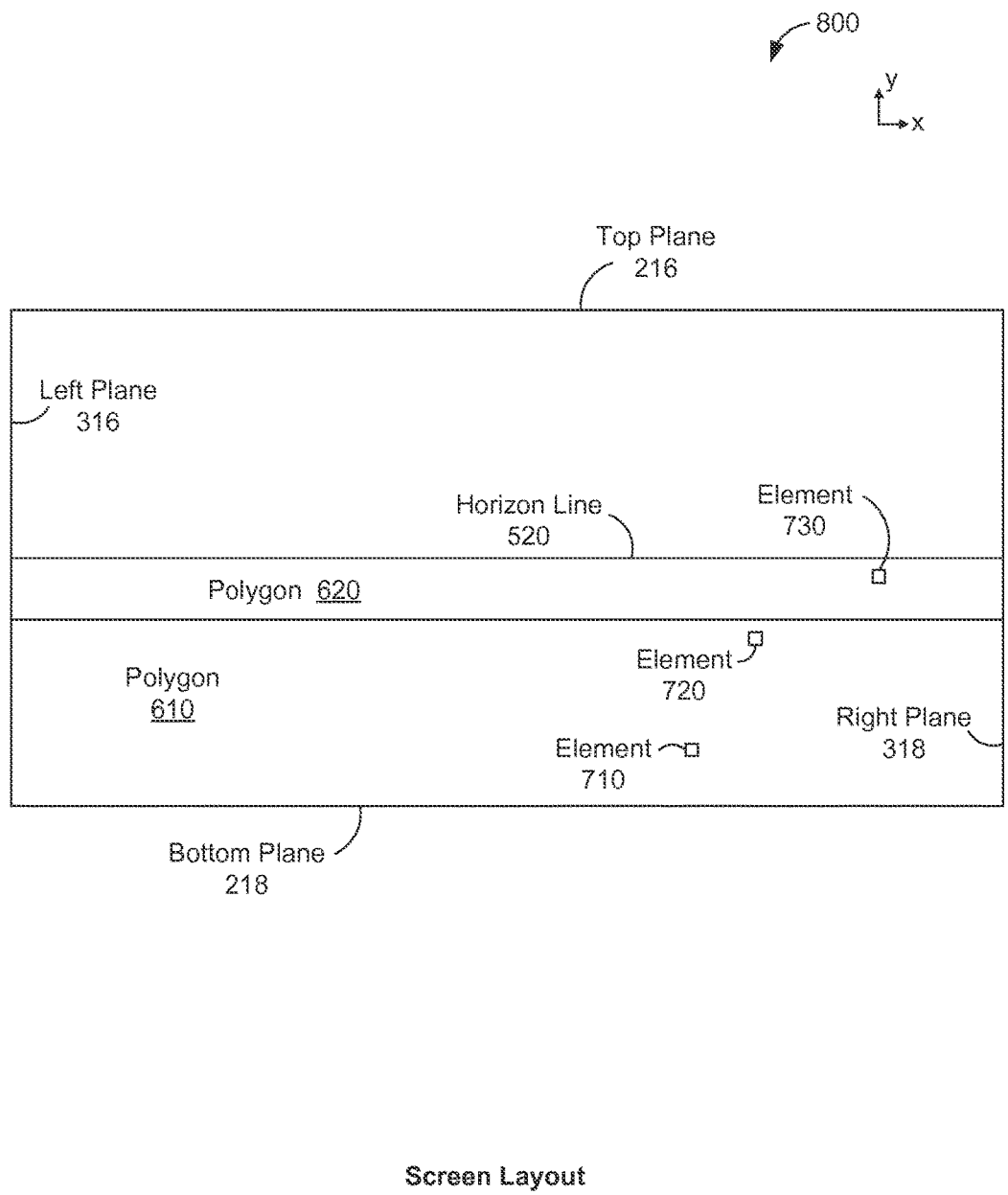
FIG. 8 is a screen layout view of an image to be rendered based on the elements of the polygons, according some example embodiments.

FIG. 8 is a screen layout view of an image 800 to be rendered based on the elements 710 and 720 of the polygon 610 and based on element 730 of the polygon 620, according some example embodiments. The scene depicted in FIG. 8 is a view of the 3D space from the position of the camera 200, looking in the direction of its orientation, with the infinite ground plane represented by the polygons 610 and 620 as they appear in FIG. 7. Accordingly, the image 800 is bounded by edges that respectively correspond to the left plane 316, the top plane 216, the right plane 318, and the bottom. plane 218.

The image 800 depicts the polygon 610 and the polygon 620, in their respective positions as shown in FIG. 7, from the perspective of the camera 200. In the example shown in FIG. 8, the polygon 610 is depicted as a quadrilateral (e.g., a "quad") bounded by the bottom edge of the image, the left edge of the image, the right edge of the image, and the polygon 620. In this example, the polygon 620 is depicted as a quadrilateral bounded by the polygon 610, the left edge of the image, the right edge of the image, and the horizon line 520. The elements 710 and 720 of the polygon 610 are shown in positions that correspond to their positions in FIG. 7. Similarly, the element 730 of the polygon 620 is shown in a position that corresponds to its position in FIG. 7.

Figure 9:
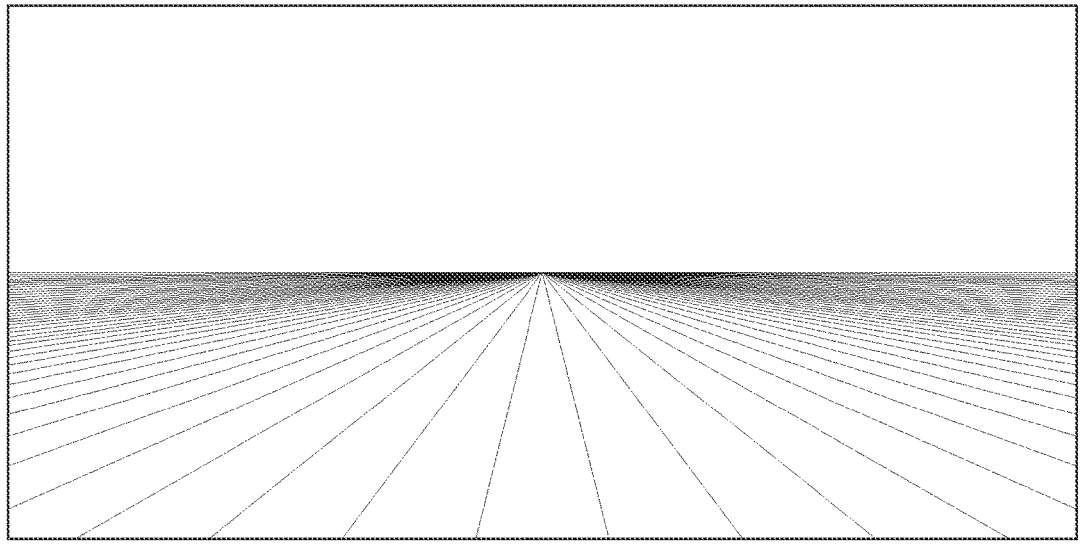
FIG. 9 is a depiction of an image (e.g., screenshot) rendered based on the elements of the polygons, according to some example embodiments.

FIG. 9 depicts the image 800 (e.g., screenshot) rendered based on the elements 710-730 of the polygons 610 and 620, according to some example embodiments. In the example shown in FIG. 9, the shader module 114 and the horizon module 116 have implemented a pattern of lines to represent the infinite ground plane or any portion thereof. For example, such lines may be parallel in the 3D space, but depicted in the image 800 as converging toward a vanishing point of the camera 200.

Figure 10:
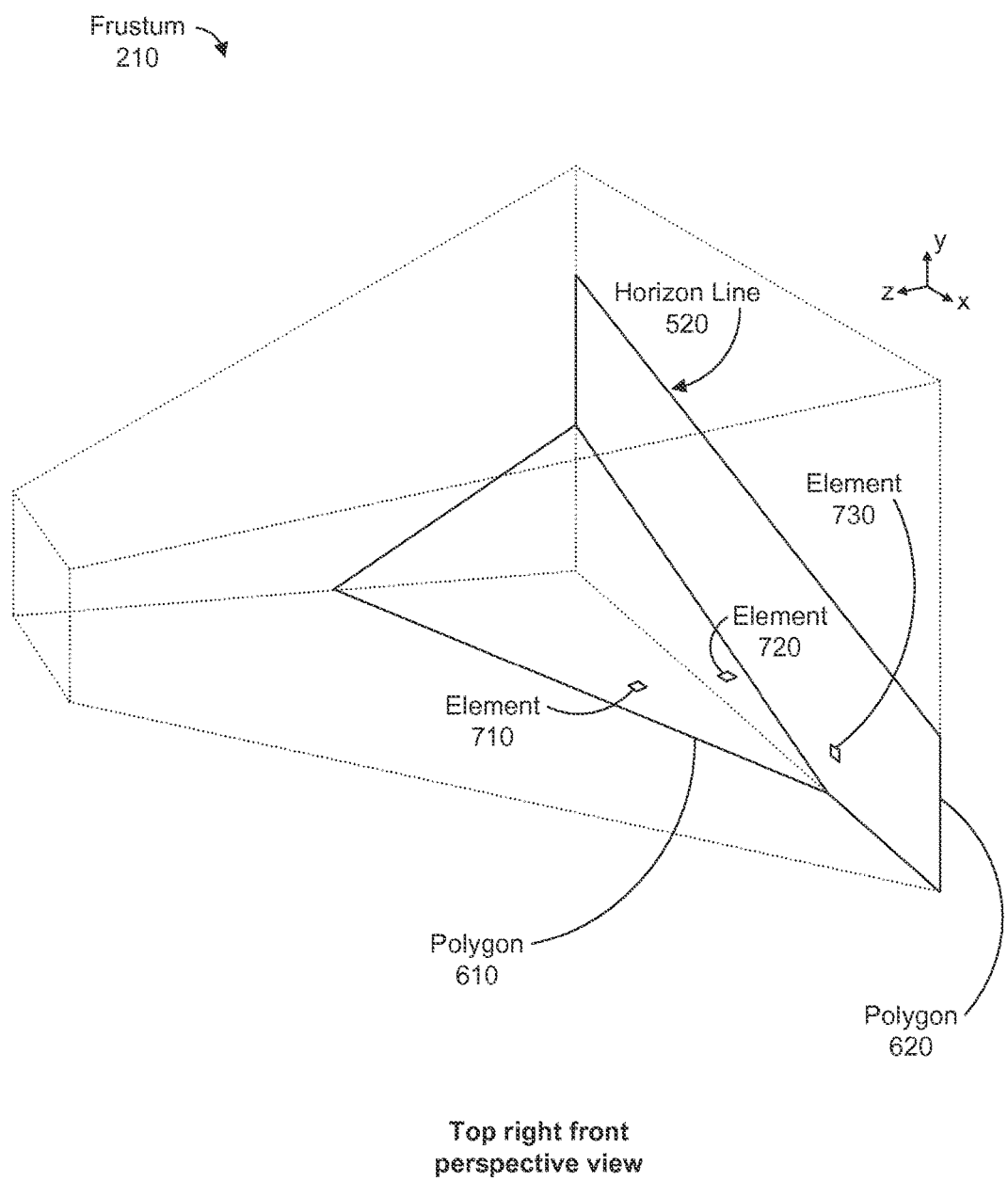
FIG. 10 is a top right front perspective view of the frustum, showing polygons and elements thereof that are suitable for rendering an infinite plane, according to certain example embodiments.

FIG. 10 is a top right front perspective view of the frustum 210, showing elements 710 and 720 of the polygon 610 and element 730 of the polygon 620, according to certain example embodiments. As discussed above, the polygon 610 represents that portion of the infinite ground plane that lies within the frustum 210. In the example embodiment shown in FIG. 10, the polygon 610 is defined by and bounded by the intersections of the infinite ground plane with the left plane 316, the bottom plane 218, and the far plane 214. As also discussed above, the polygon 620 represents that portion of the infinite ground plane that lies beyond the far plane 214. In the example embodiment shown in FIG. 10, the polygon 620 is defined by and bounded by the horizon line 520, the left plane 316, the right plane 318, the bottom plane 218, and the intersection of the polygon 610 with the far plane 214. As noted above, the intersection of the polygon 610 with the far plane 214 may also be denoted as the intersection of the infinite ground plane with the far plane 214.

Figure 11:
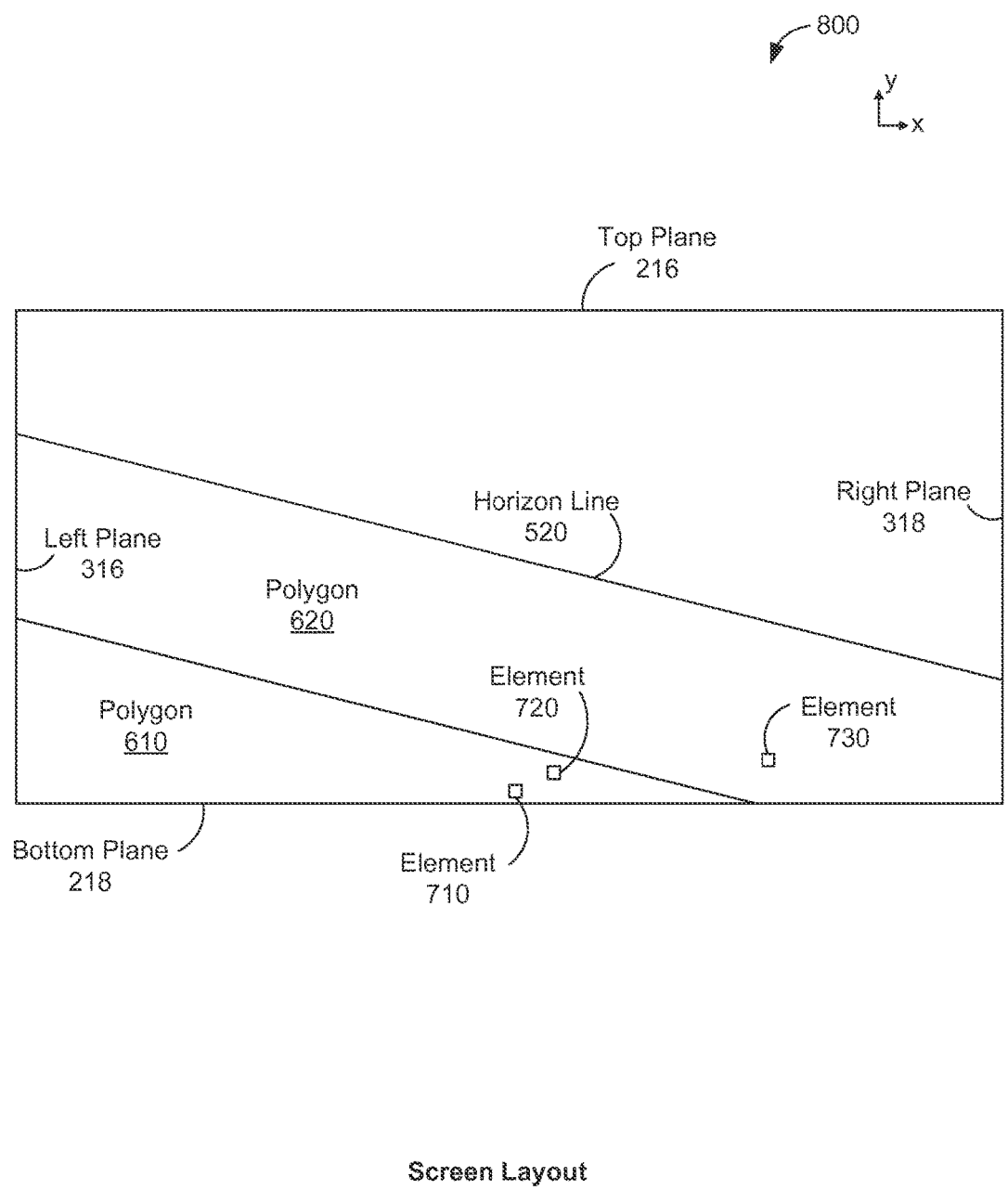
FIG. 11 is a screen layout view of an image to be rendered based on the elements of the polygons, according to certain example embodiments.

FIG. 11 is a screen layout view of the image 800 (e.g., screenshot) to be rendered based on the elements 710 and 720 of the polygon 610 and based on element 730 of the polygon 620, according to certain example embodiments. The scene depicted in FIG. 11 is a view of the 3D space from the position of the camera 200, looking in the direction of its orientation, with the infinite ground plane represented by the polygons 610 and 620 as they appear in FIG. 10. Accordingly, the image 800 is bounded by edges that respectively correspond to the left plane 316, the top plane 216, the right plane 318, and the bottom plane 218.

The image 800 depicts the polygon 610 and the polygon 620, in their respective positions as shown in FIG. 10, from the perspective of the camera 200. In the example shown in FIG. 11, the polygon 610 is depicted as a triangle bounded by the bottom edge of the image, the left edge of the image, and the polygon 620. In this example, the polygon 620 is depicted as an irregular pentagon bounded by the polygon 610, the left edge of the image, the right edge of the image, the bottom edge of the image, and the horizon line 520. The elements 710 and 720 of the polygon 610 are shown in positions that correspond to their positions in FIG. 10. Similarly, the element 730 of the polygon 620 is shown in a position that corresponds to its position in FIG. 10.

Figure 12:
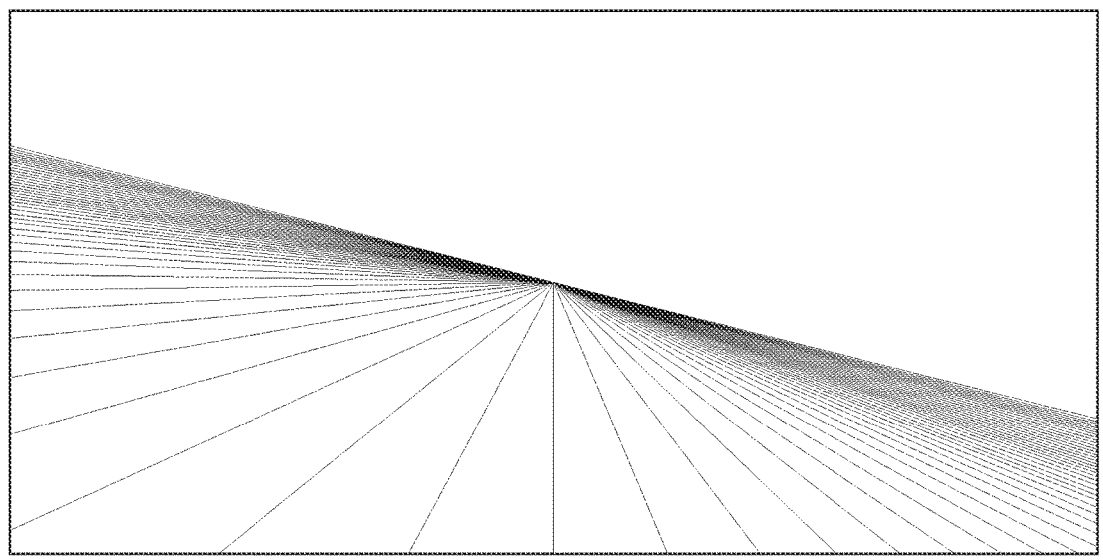
FIG. 12 is a depiction of an image (e.g., screenshot) rendered based on the elements of the polygons, according to certain example embodiments.

FIG. 12 depicts the image 800 (e.g., screenshot) rendered based on the elements of the polygons, according to certain example embodiments. In the example shown in FIG. 12, the shader module 114 and the horizon module 116 have implemented a pattern of lines to represent the infinite ground plane or any portion thereof. For example, such lines may be parallel in the 3D space, but depicted in the image 800 as converging toward a vanishing point of the camera 200.

Figure 13:
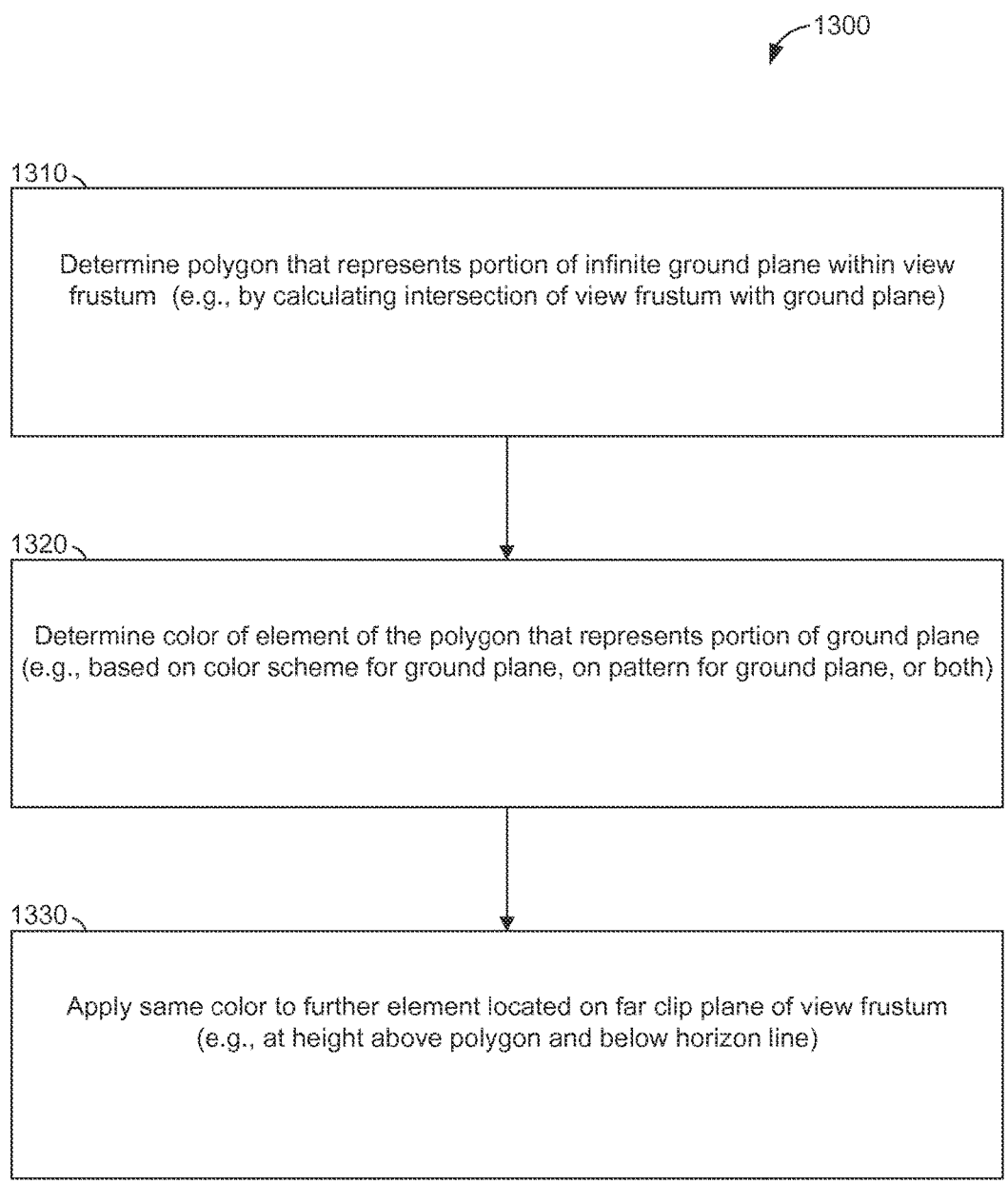
FIG. 13-15 are flowcharts illustrating operations of a machine in performing a method of rendering an infinite plane (e.g., an infinite ground plane), according to some example embodiments.
Figure 14:
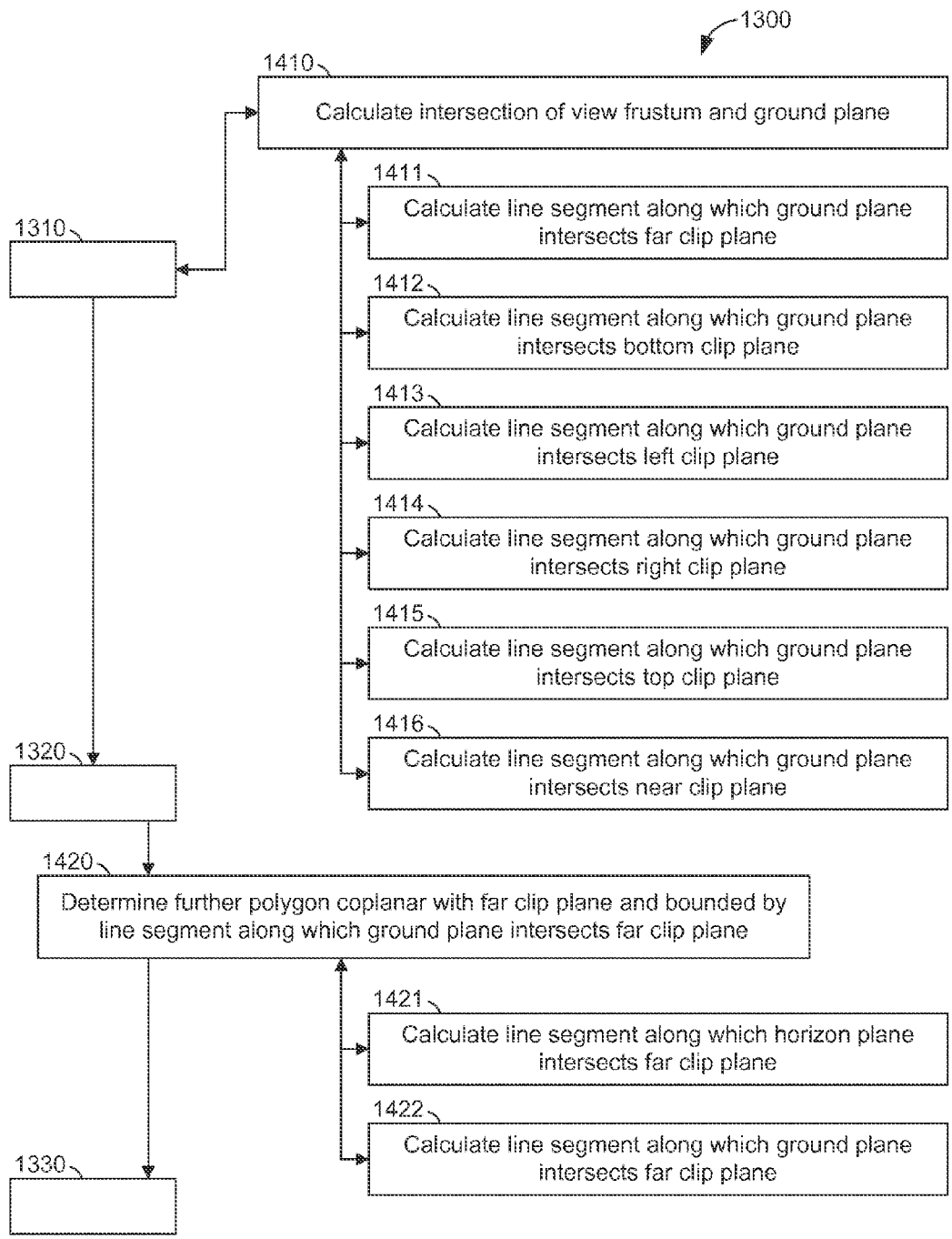
Figure 15:
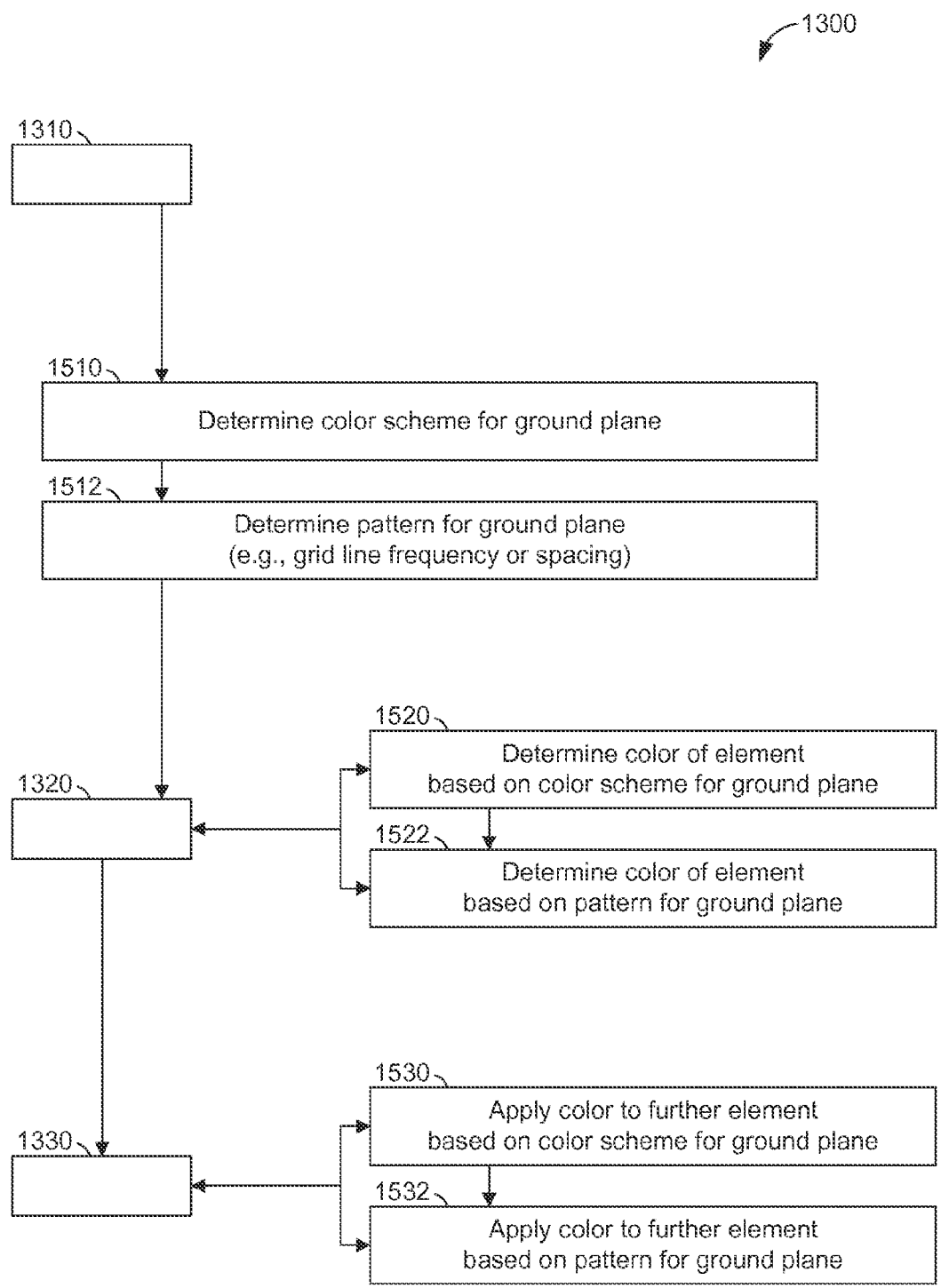

FIG. 13-15 are flowcharts illustrating operations of the machine 110 in performing a method 1300 of rendering an infinite ground plane, in whole or in part, according to some example embodiments. Operations in the method 1300 may be performed by the machine 110, using modules described above with respect to FIG. 1. As shown in FIG. 13, the method 1300 includes operations 1310, 1320, and 1330.

In operation 1310, the polygon module 112 of the machine 110 determines the polygon 610 within the frustum 210. For example, the polygon module 112 may calculate an intersection of the frustum 210 with the ground plane (e.g., the infinite ground plane to be rendered in whole or in part). As noted above, the ground plane may be an infinite ground plane that is defined by a set of all points within the 3D space for which height (e.g., z-coordinate or y-coordinate, representing distance along a vertical axis) is zero with respect to the 3D space (e.g with respect to a coordinate system of the 3D space). As also noted above, the polygon 610 may be defined by the intersection of the frustum 210 and the ground plane, and the polygon 610 may be representative of a portion of the ground plane that lies within the frustum 210.

In operation 1320, the shader module 114 determines a color. This color may be the color of the element 720 within the polygon 610. As noted above, the shader module 140 may determine the color of the element 720 using one or more algorithms (e.g., shading algorithms), color schemes, texture schemes, grid patterns, color gradients, brightness gradients, default values, or other programming for depicting the infinite ground plane within the 3D space.

In operation 1330, the horizon module 116 determines a color. This color may be the color of the element 730 within the polygon 620. According to some example embodiments, the horizon module 116 may apply the color of the element 720 to the element 730. Accordingly, the horizon module 116 may determine the color of the element 730 by applying the color of the element 720 to the element 730. As noted above, the element 730 may be located on the far plane 214 and located at a non-zero height above the polygon 610 within the 3D space.

After operation 1330, the render module 118 may render the image 800 based on the color of the element 720, the color of the element 730, or both. In some example embodiments, the color of the element 710 is also a basis for the rendering of the image 800 by the render module 118. In certain example embodiments, the render module 118 renders the image 800 based on the colors of other elements (e.g., all elements) of the polygons 610 and 620. The render module 118 may then store the image 800 (e.g., in a database), communicate the image 800 (e.g., via a network), present the image 800 (e.g., display the image 800 on a screen), or any suitable combination thereof.

As shown in FIG. 14, the method 1300 may include one or more of operations 1410 and 1420. Operation 1410 may be performed as part (e.g., a precursor task, a subroutine, or a portion) of operation 1310, in which the polygon module 112 determines the polygon 610. In operation 1410, the polygon module 112 performs the calculation of the intersection of the frustum 210 and the ground plane, as described above with respect to operation 1310. One or more of operations 1411, 1412, 1413, 1414, 1415, and 1416 may be performed as part of operation 1410.

In operation 1411, the polygon module 112 calculates a line segment along which the ground plane intersects the far plane 214 of the frustum 210. The far plane 214 may define a maximum distance (e.g., a maximum depth along a z-axis in x-y-z space) to which an object is renderable in the frustum 210. This may have the effect of determining a far or top (e.g., upper) edge of the polygon 610 along which the polygon 610 will intersect the polygon 620.

In operation 1412, the polygon module 112 calculates a line segment along which the ground plane intersects the bottom plane 218 of the frustum 210. The bottom plane 218 may define a minimum height (e.g., a minimum height along a y-axis in x-y-z space) to which an object is renderable in the frustum 210. This may have the effect of determining a near edge or bottom (e.g., lower) edge of the polygon 610.

In operation 1413, the polygon module 112 calculates a line segment along which the ground plane intersects the left plane 316 of the frustum 210. The left plane 316 may define a leftmost extent (e.g., a maximum leftward distance along an x-axis in x-y-z-space) to which an object is renderable in the frustum 210. This may have the effect of determining a left edge of the polygon 610.

In operation 1414, the polygon module 112 calculates a line segment along which the ground plane intersects the right plane 318 of the frustum 210. The right plane 318 may define a rightmost extent (e.g., a maximum rightward distance along an x-axis in x-y-z space) to which an object is renderable in the frustum 210. This may have the effect of determining a right edge of the polygon 610.

In operation 1415, the polygon module 112 calculates a line segment along which the ground plane intersects the top plane 216 of the frustum 210. The top plane 216 may define a maximum height (e.g., a maximum height along a y-axis in x-y-z space) to which an object is renderable in the frustum 210. This may have the effect of determining a far or top (e.g., upper) edge of the polygon 610.

In operation 1416, the polygon module 112 calculates a line segment along which the ground plane intersects the near plane 212 of the frustum 210. The near plane 212 may define a minimum distance (e.g., a minimum depth along a z-axis in x-y-z space) to which an object is renderable in the frustum 210. This may have the effect of determining a near or bottom (e.g., lower) edge of the polygon 610.

In operation 1420, the polygon module 112 determines the polygon 620 within the frustum 210. As noted above, the polygon 620 is coplanar with the far plane 214 of the frustum 210. Moreover, the polygon 620 may be bounded by a line segment along which the ground plane intersects the far plane 214. As discussed above, this line segment may also be referred to as the intersection of the polygon 610 with the far plane 214. According to some example embodiments, the applying (e.g., application) of the color to the element 730 in operation 1330 may be based on the element 730 being in the polygon 620. In certain example embodiments, the applying of the color to the element 730 in operation 1330 also applies the color to the polygon 620, in whole or in part.

One or more of operations 1421 and 1422 may be performed as part of operation 1420. In operation 1421, the polygon module 112 calculates a line segment (e.g., a further line segment) along which the horizon plane 220 intersects the far plane 214 of the frustum 210. The horizon plane 220 may define a horizon from a viewpoint of the frustum 210 (e.g., the viewpoint of the camera 200, with respect to which the frustum 210 may be defined). This may have the effect of determining the horizon line 520, which as noted above may be a boundary of the polygon 620.

In operation 1422, the polygon module 112 calculates a line segment along which the ground plane intersects the far plane 214 of the frustum. 210. This is similar to operation 1411 described above. As part of operation 1420, however, operation 1422 may have the effect of determining a bottom (e.g., lower) edge of the polygon 620.

As shown in FIG. 15, the method 1300 may include one or more of operations 1510, 1512, 1520, 1522, 1530, and 1532. In operation 1510, the shader module 114 determines a color scheme of the ground plane, as represented by the polygon 610 (e.g., a color scheme for coloring or texturing the polygon 610 to depict the ground plane). According to various example embodiments, the shader module 114 may select, access (e.g., from a database), or use one or more color schemes for depicting the ground plane within the 3D space. Examples of a color scheme include a solid color (e.g., a uniform color), a color gradient (e.g., a smooth or continuous transition between two colors), a brightness gradient (e.g., a smooth or continuous transition between two levels of brightness), and any suitable combination thereof.

In operation 1512, the shader module 114 determines a pattern. of the ground plane, as represented by the polygon 610 (e.g., a pattern of gridlines for coloring or texturing the polygon 610 to depict the ground plane). According to various example embodiments, the shader module 114 may select, access (e.g., from a database), or use one or more patterns by which the polygon 610 may be designated as being representative of the ground plane. In some example embodiments, the pattern determined by the shader module 114 is a pattern of gridlines for depicting the ground plane within the 3D space. Hence, operation 1512 may include determining a frequency or spacing for the pattern (e.g., one unit width line for every 20 units of distance in a u-v space that is local to the polygon 610). For example, operation 1512 may include determining a frequency of gridlines that designate the ground plane.

One or more of operations 1520 and 1522 may be performed as part of operation 1320, in which the shader module 114 determines the color of the element 720 in the polygon 610. In operation 1520, the shader module 114 determines the color of the element 720 based on the color scheme for the ground plane (e.g., as determined in operation 1510). In operation 1522, the shader module 114 determines the color of the element 720 based on the pattern of the ground plane (e.g., as determined in operation 1512).

One or more of operations 1530 and 1532 may be performed as part of operation 1330, in which the horizon module 116 determines the color of the element 730 in the polygon 620. In operation 1530, the horizon module 116 determines the color of the element 730 based on the color scheme for the ground plane (e.g., as determined in operation 1510). In operation 1532, the horizon module 116 determines the color of the element 730 based on the pattern of the ground plane (e.g., as determined in operation 1512). Accordingly, operation 1330 may be performed based on the pattern of the ground plane (e.g., the pattern by which the polygon 610 is designated as being representative of the ground plane). In some example embodiments in which operation 1512 includes determining a frequency of gridlines that designate the ground plane, operation 1330 may be performed based on the frequency of the gridlines.

According to various example embodiments, one or more of the methodologies described herein may facilitate rendering of a plane in a 3D space, where the plane may be infinite within the 3D space (e.g., an infinite ground plane). Moreover, one or more of the methodologies described herein may facilitate coloring, texturing, or patterning one or more polygons that depict the plane within a view frustum. Hence, one or more of the methodologies described herein may facilitate rendering and presentation of one or more views of the 3D space (e.g., the images or scenes that depict the portion of the 3D space from the viewpoint of a virtual camera in the 3D space). When these effects are considered in aggregate, one or more of the methodologies described herein may allow the rendering of an infinite plane using finite resources.

Figure 16:
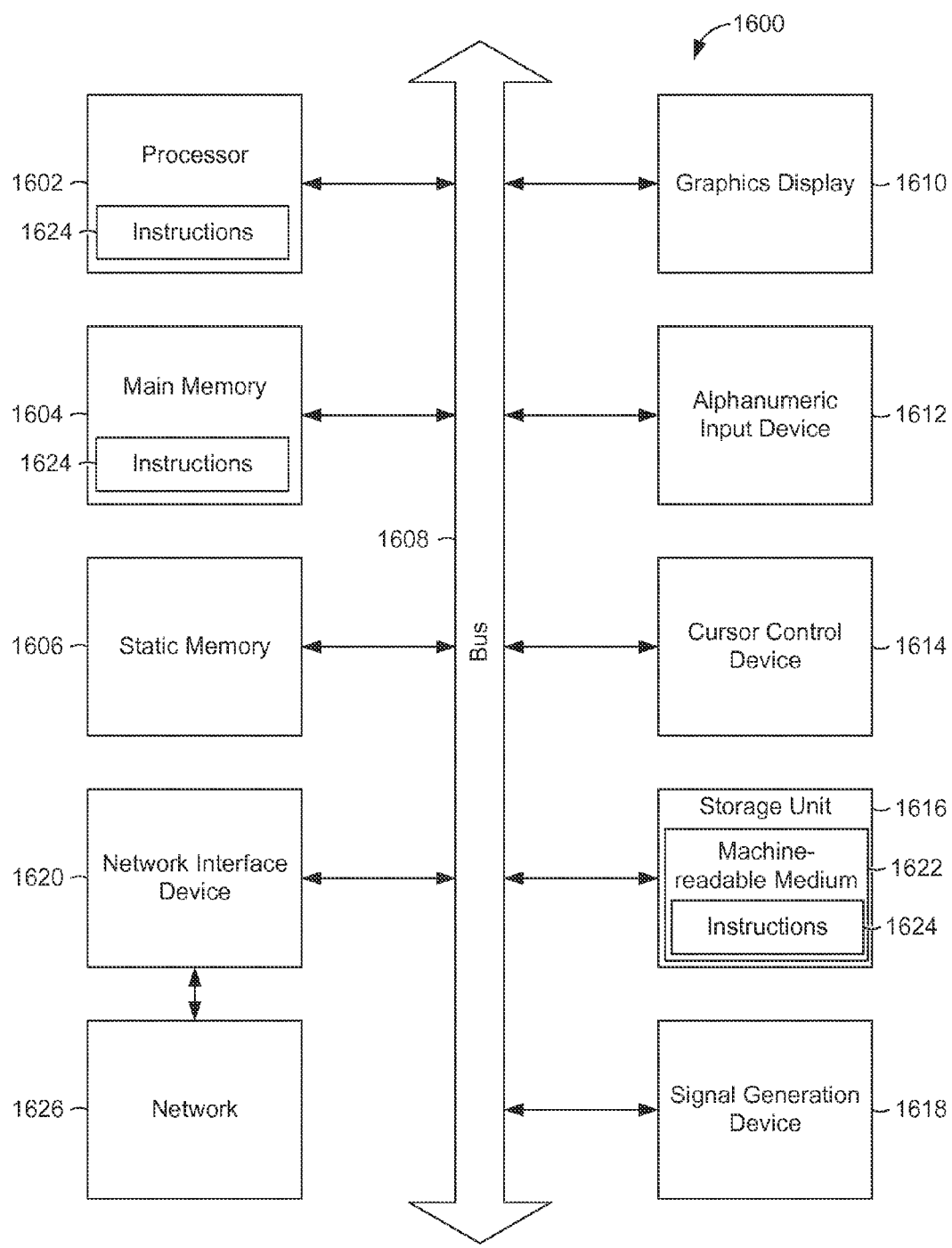
FIG. 16 is a block diagram illustrating components of a machine, according to some example embodiments, able to read instructions from a machine-readable medium and perform any one or more of the methodologies discussed herein.

FIG. 16 is a block diagram illustrating components of a machine 1600, according to some example embodiments, able to read instructions from a machine-readable medium. (e.g., a machine-readable storage medium) and perform any one or more of the methodologies discussed herein, in whole or in part. Specifically, FIG. 16 shows a diagrammatic representation of the machine 1600 in the example form of a computer system and within which instructions 1624 (e.g., software, a program, an application, an applet, an app, or other executable code) for causing the machine 1600 to perform any one or more of the methodologies discussed herein may be executed. In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a peer-to-peer (or distributed) network environment. The machine 1600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include a collection of machines that individually or jointly execute the instructions 1624 to perform any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The machine 1600 may further include a graphics display 1610 (e.g., a plasma display panel (PDP), a light emitting diode (LED) display, a liquid crystal display (LCD), a projector, or a cathode ray tube (CRT)). The machine 1600 may also include an alphanumeric input device 1612 (e.g., a keyboard), a cursor control device 1614 (e.g., a mouse, a touchpad, a trackball, a joystick, a motion sensor, or other pointing instrument), a storage unit 1616, a signal generation device 1618 (e.g., a speaker), and a network interface device 1620.

The storage unit 1616 includes a machine-readable medium 1622 on which is stored the instructions 1624 embodying any one or more of the methodologies or functions described herein. The instructions 1624 may also reside, completely or at least partially, within the main memory 1604, within the processor 1602 (e.g., within the processor's cache memory), or both, during execution thereof by the machine 1600. Accordingly, the main memory 1604 and the processor 1602 may be considered as machine-readable media. The instructions 1624 may be transmitted or received over a network 1626 (e.g., the Internet) via the network interface device 1620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium. or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1600), such that the instructions, when executed by one or more processors of the machine (e.g., processor 1602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform. certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a nonexclusive "or," unless specifically stated otherwise.

What is claimed is:

1. A method for rendering an infinite plane, the method comprising:
    calculating a first polygon with boundaries corresponding to intersections between an infinite plane and a viewing frustum, the viewing frustum defined by a far plane, a right plane, and a left plane;
    calculating a second polygon on the far plane representing a portion of the infinite plane beyond the viewing frustum between the right plane and the left plane;
    determining a color of an element of the first polygon or a color of an element of the second polygon; and
    coloring or texturing at least a portion of the first polygon and at least a portion of the second polygon to seamlessly blend a transition between the first polygon and the second polygon by a processor of a machine.

2. The method of claim 1, wherein the color of the element of the first polygon is determined, and the color of the element of the first polygon is duplicated in elements of the second polygon.

3. The method of claim 1, wherein the color of two or more elements of the first polygon are determined.

4. The method of claim 3, wherein the color of the element of the first polygon that is closest to the intersection of the first polygon and the second polygon is duplicated in elements of the second polygon.

5. The method of claim 1, wherein determining a color comprises determining values for hue, saturation, intensity, and transparency.

6. The method of claim 1, wherein coloring or texturing at least a portion of the first polygon and at least a portion of the second polygon comprises applying a grid pattern from the first polygon in the second polygon.

7. The method of claim 1, wherein coloring or texturing at least a portion of the first polygon and at least a portion of the second polygon comprises implementing a smooth single-color gradient.

8. The method of claim 7, wherein a boundary of the second polygon is a horizon line on the far plane, wherein the smooth single-color gradient is darker near the horizon line and brighter at increasing distances from the horizon line.

9. The method of claim 1, wherein a top edge of the second polygon is not parallel to a line where a top plane of the viewing frustum meets the far plane of the viewing frustum.

10. The method of claim 1, wherein the first polygon has four sides.

11. A machine for rendering an infinite plane, the machine comprising a processor and a memory, the machine further comprising:
    a polygon module configured to calculate a first polygon defined by an intersection of a viewing frustum with a first portion of an infinite plane lying within the viewing frustum and calculate a second polygon on the far plane representing a second portion of the infinite plane beyond the viewing frustum;
    a shader module, configured to determine a color of an element within the first polygon;
    a horizon module, configured to determine a color of an element within the second polygon; and
    a render module, configured to render the infinite plane based on the color of the element within the first polygon, the color of the element within the second polygon, or both.

12. The machine of claim 11, wherein the horizon module is configured to determine the color of the element of the second polygon by applying the color of the element of the first polygon to the element of the second polygon.

13. The machine of claim 11, wherein the color is a color scheme selected from the group consisting of a solid color, a color gradient, a brightness gradient, and combinations thereof.

14. The machine of claim 13, wherein the shader module is configured to determine a pattern of the first polygon.

15. The machine of claim 14, wherein the shader module is configured to determine the color of the element within the first polygon based on the pattern of the first polygon.

16. The machine of claim 15, wherein the horizon module is configured to determine the color of the element within the second polygon based on the pattern of the first polygon.

17. The machine of claim 11, wherein the shader module and the horizon module are configured to determine a color based on one or more of shading algorithms, color schemes, texture schemes, grid patterns, color gradients, brightness gradients, or default values.

18. The machine of claim 11, wherein the shader module is configured to determine a color by implementing a grid pattern.

19. The machine of claim 18, wherein the grid pattern comprises grid lines with no transparency and spaces between grid lines with transparency.

20. The machine of claim 11, wherein the polygon module is configured to determine a horizon line as a line segment along which a horizon plane intersects the far plane of the viewing frustum.

* * * * *